US011707984B2

(12) United States Patent
Anand et al.

(10) Patent No.: US 11,707,984 B2
(45) Date of Patent: Jul. 25, 2023

(54) CIRCUIT DEVICE, ELECTRONIC APPARATUS, AND MOBILE BODY

(71) Applicant: SEIKO EPSON CORPORATION, Tokyo (JP)

(72) Inventors: Kumar Anandabairavasamy Anand, Richmond (CA); Wittmeir Manfred, Aichach (DE); Jeffrey Eric, Richmond (CA); Tetsuo Kawamoto, Suwa (JP); Yasutoshi Akiba, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 624 days.

(21) Appl. No.: 16/720,401

(22) Filed: Dec. 19, 2019

(65) Prior Publication Data

US 2020/0201035 A1 Jun. 25, 2020

Related U.S. Application Data

(60) Provisional application No. 62/782,657, filed on Dec. 20, 2018.

(51) Int. Cl.

| | |
|---|---|
| ***B60K 35/00*** | (2006.01) |
| ***G02B 27/01*** | (2006.01) |
| ***G02B 6/28*** | (2006.01) |
| ***G06V 40/16*** | (2022.01) |
| ***G06V 10/56*** | (2022.01) |
| ***G06V 10/98*** | (2022.01) |

(52) U.S. Cl.

CPC ............ *B60K 35/00* (2013.01); *G02B 6/2848* (2013.01); *G02B 27/01* (2013.01); *G06V 10/56* (2022.01); *G06V 10/993* (2022.01); *G06V 40/161* (2022.01)

(58) Field of Classification Search

CPC ..... G02B 27/01; G02B 6/2848; G06V 40/161
USPC .......................................................... 359/602
See application file for complete search history.

(56) References Cited

U.S. PATENT DOCUMENTS

| | | | | |
|---|---|---|---|---|
| 2016/0025973 A1* | 1/2016 | Guttag | .................. | B60K 35/00 345/7 |
| 2017/0229098 A1 | 8/2017 | Uchida | | |

FOREIGN PATENT DOCUMENTS

| | | | | |
|---|---|---|---|---|
| DE | 102010013532 A1 * | 10/2010 | .............. | B60R 1/00 |
| JP | 2004284508 A * | 10/2004 | | |
| JP | 2005162191 A * | 6/2005 | .............. | B60R 1/00 |
| JP | 2008-083429 A | 4/2008 | | |
| JP | 2013-246379 A | 12/2013 | | |
| JP | 2014-130278 A | 7/2014 | | |
| JP | 2016-024202 A | 2/2016 | | |
| JP | 2018-017878 A | 2/2018 | | |

* cited by examiner

*Primary Examiner* — Jerry L Brooks
(74) *Attorney, Agent, or Firm* — Rankin, Hill & Clark LLP

(57) ABSTRACT

A circuit device 100 includes an error detection circuit 110 and a processing circuit 120. The error detection circuit 110 obtains a glare index value, which is an index value indicating glare of a head-up display, based on image data IMD for head-up display. The error detection circuit 110 determines whether or not a glare index value has exceeded a first threshold value, and when the glare index value exceeds the first threshold value, detects occurrence of a first glare error. When occurrence of a first glare error is detected, the processing circuit 120 performs processing corresponding to the first glare error.

15 Claims, 11 Drawing Sheets

10

CIRCUIT DEVICE, ELECTRONIC APPARATUS, AND MOBILE BODY

The present application is based on, and claims priority from U.S. Application Ser. No. 62/782,657, filed Dec. 20, 2018, the disclosure of which is hereby incorporated by reference herein in its entirety.

BACKGROUND

1. Technical Field

The present invention relates to a circuit device, an electronic apparatus, a mobile body, and the like.

2. Related Art

There are known head-up displays (HUD) in which information is displayed to be superimposed in a user's field of vision by projecting an image onto a transparent object. Patent Document 1 discloses a technique for adjusting the brightness of display in such a head-up display. The head-up display disclosed in Patent Document 1 includes a light-emitting element, a liquid crystal display element, a reflective mirror, and a control means, and the light-emitting element irradiates light onto the crystal display element, the reflective mirror reflects the light that has passed through the liquid crystal element so as to project an image on the windshield of the automobile, and the control means controls the brightness of display by controlling the current for driving the light-emitting element.

JP-A-2008-83429 is an example of the related art.

SUMMARY

Since head-up displays are displays for superimposing information over a user's field of vision, an image having a size and luminance that enable visual recognition of the background of a head-up display is usually displayed on the head-up display. If the ratio of pixels that block the background increases in the display region of a head-up display, or when the luminance exceeds a certain amount, there is a risk that it will be difficult for the user to visually recognize the background of the head-up display.

An aspect of the present disclosure pertains to a circuit device that includes an error detection circuit that obtains a glare index value, which is an index value indicating glare of a head-up display, based on image data for head-up display, determines whether or not the glare index value has exceeded a first threshold value, and, when the glare index value exceeds the first threshold value, detects occurrence of a first glare error; and a processing circuit that performs processing corresponding to the first glare error when occurrence of the first glare error is detected.

BRIEF DESCRIPTION OF THE DRAWINGS

The disclosure will be described with reference to the accompanying drawings, wherein like numbers reference like elements.

DESCRIPTION OF EXEMPLARY EMBODIMENTS

Preferred embodiments of the disclosure will be described below in detail. It is to be noted that the embodiments described below are not intended to unduly limit the content described in the scope of the claims, and not all configurations described in the embodiments are necessarily essential constituent elements.

1. Circuit Device

Figure 1:
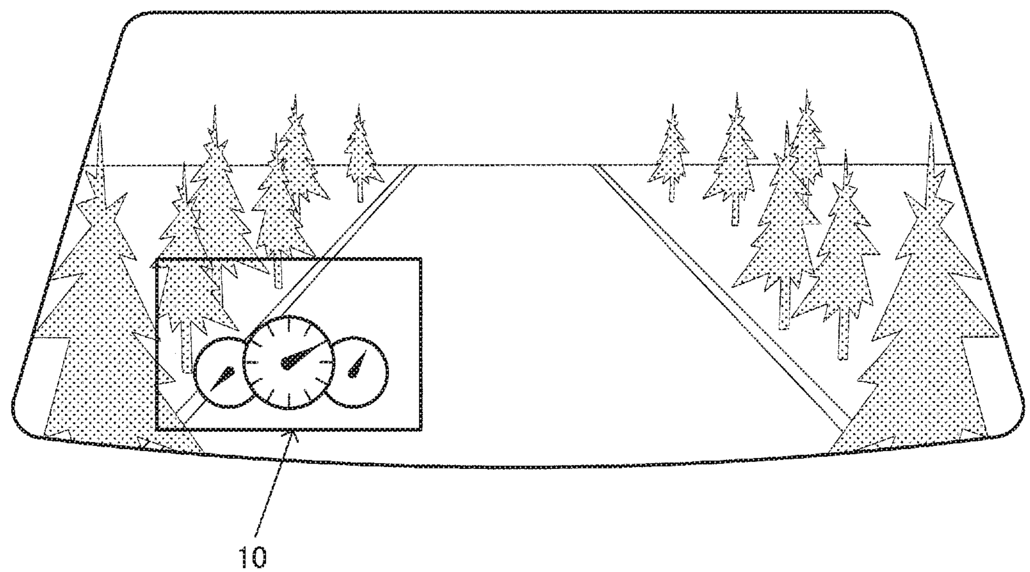
FIG. 1 is a display example of a head-up display.

FIG. 1 is a display example of a head-up display. As an example, a case will be described below in which a head-up display is installed in a mobile body such as an automobile, aircraft, or vessel, and information is presented to the user aboard the mobile body. Note that applications of the head-up display are not limited to mobile bodies, and it suffices for information to be presented in a state of being superimposed over a user's field of vision.

As shown in FIG. 1, a view of the outside of a mobile body, a pilot's seat in the mobile body, and the like are visible to the user. Hereinafter, these are referred to as "background". A screen 10 of the head-up display is provided within the background, and the background is transmitted through the screen 10 excluding an information presentation portion. In the example in FIG. 1, a meter display is the information presentation portion, and the background is transmitted through the meter display excluding a meter portion thereof. Accordingly, the user can view the information displayed on the head-up display along with the background.

Figure 2:
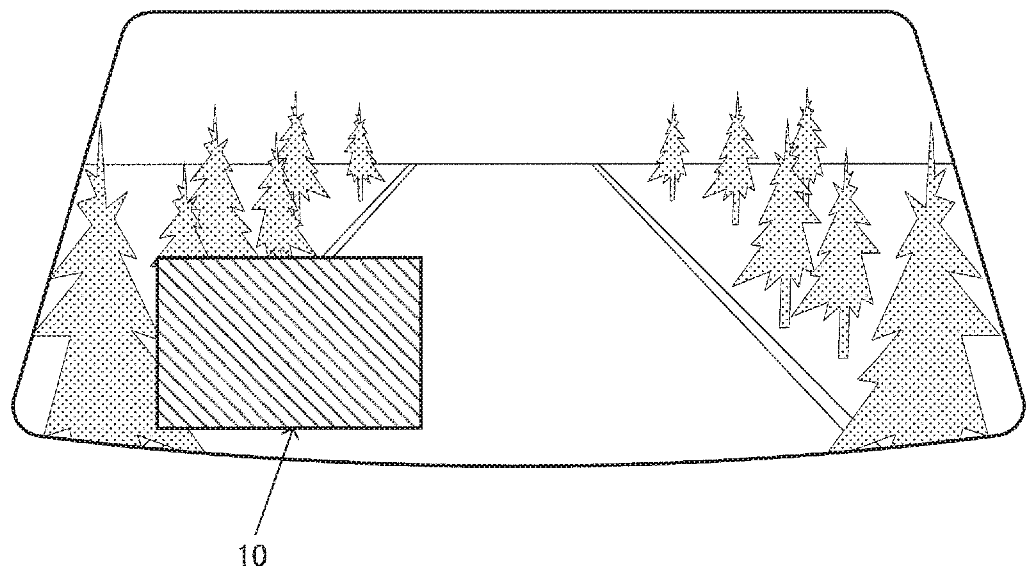
FIG. 2 is a display example of the head-up display.

Normally, the ratio of the space occupied by the information presentation portion in the screen 10 is low to enable the user to visually recognize the background that is transmitted through the screen 10 of the head-up display. On the other hand, as shown in FIG. 2, if the ratio of a region in which the background is blocked is large in the screen 10 of the head-up display, the user cannot visually recognize the background in the region of the screen 10. Alternatively, there is a risk that the screen 10 of the head-up display will be too bright against the background, thus reducing the visual recognizability of the background. For example, assume that the pixel values are in a range of 0 to 255, and the background is transmitted through pixels having a pixel value of 0. At this time, as the pixel value of a pixel increases from 0, the background becomes less visible through the pixel. When the ratio of such pixels that block the background increases to a certain degree, the visual recognizability of the background reduces as described above.

Such a state occurs due to an abnormality in image data. A case where wrong image data is input to the head-up display, or a case where an abnormality occurs in image processing due to a circuit abnormality or the like can be envisioned as examples of an abnormality occurring in image data.

Figure 3:
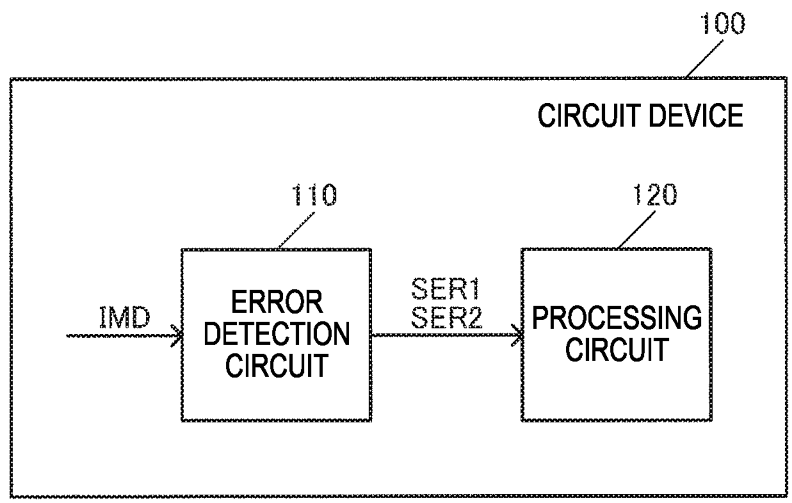
FIG. 3 is a configuration example of a circuit device.

FIG. 3 is a configuration example of a circuit device 100 in this embodiment. The circuit device 100 is a circuit device arranged on a path on which image data to be displayed on the head-up display is processed. Specifically, the circuit device 100 is provided in a device for outputting image data to the head-up display, or in the head-up display. As will be described later, a display controller or a display driver can be envisioned as an example of the circuit device 100.

The circuit device 100 includes an error detection circuit 110 and a processing circuit 120. The error detection circuit 110 obtains a glare index value, which is an index value indicating glare of the head-up display, based on image data IMD for head-up display. The error detection circuit 110 determines whether or not the glare index value has exceeded a first threshold value, and when the glare index value exceeds the first threshold value, detects the occurrence of a first glare error. When occurrence of a first glare error is detected, the processing circuit 120 performs processing corresponding to the first glare error.

The image data IMD for head-up display is image data input to the circuit device 100, image data subjected to image processing in the circuit device 100, or image data to be output to the outside by the circuit device 100. The image data IMD for head-up display is subjected to later-stage image processing and the like in the circuit device 100, and is lastly displayed on the head-up display.

The glare index value is an index value indicating glare of the head-up display as described above. Specifically, the glare index value indicates a degree to which the image data IMD for head-up display will reduce the visual recognizability of the background when displayed on the head-up display. Specifically, as described with reference to FIG. 2, there are cases where an image displayed on the head-up display blocks the background, or the background is made less visible due to the glare of an image displayed on the head-up display, and the glare index value indicates a degree thereof in such a case.

The error detection circuit 110 determines whether or not the glare index value has exceeded the first threshold value, and outputs the determination result as a first error signal SER1. When the glare index value exceeds the first threshold value, the error detection circuit 110 activates the first error signal SER1. Upon receiving the active first error signal SER1, the processing circuit 120 performs processing corresponding to a first glare error.

The processing corresponding to a first glare error is processing for notifying a device outside of the circuit device 100 of the error or processing for dealing with the error in the circuit device 100.

The processing for notifying a device outside of the circuit device 100 of an error may be either processing for making a notification regarding the occurrence of the error only and leaving a handling method up to the external device, or processing for notifying the external device of a method for dealing with the error. The external device that has received the notification can take various measures such as stopping the output of image data, bringing image data into a blank state, or performing image processing for reducing the luminance of the image. Note that "image data in a blank state" refers to image data that allows the background to be transmitted through the entire head-up display when the image is displayed on the head-up display.

When an error is dealt with in the circuit device 100, the circuit device 100 can take various measures such as stopping outputting of image data, bringing image data into a blank state, performing image processing for reducing the luminance of the image, and the like.

According to this embodiment, a glare index value is obtained from image data IMD for head-up display, and the occurrence of a first glare error is detected based on the glare index value. Accordingly, it is possible to detect, from image data, whether or not an image to be displayed on the head-up display will reduce the visual recognizability of the background. Since it is possible to detect image data that will reduce the visual recognizability of the background, the circuit device 100 or an external device outside thereof can perform processing for preventing a reduction in the visual recognizability based on the detection result.

In addition, in this embodiment, the error detection circuit 110 determines whether or not the glare index value has exceeded a second threshold value, and, when it is determined that the glare index value has exceeded the second threshold value, detects the occurrence of a second glare error. The second threshold value is larger than the first threshold value.

Specifically, the error detection circuit 110 determines whether or not the glare index value has exceeded the second threshold value, and outputs the determination result as a second error signal SER2. When the glare index value exceeds the second threshold value, the error detection circuit 110 activates the second error signal SER2. Upon receiving the active second error signal SER2, the processing circuit 120 performs processing corresponding to a second glare error.

With such a configuration, the occurrence of a glare error can be detected using threshold values at two levels, and appropriate error handling processing can be executed in accordance with a glare error at each of the levels. In this embodiment, the second threshold value is larger than the first threshold value, and thus a degree to which the visual recognizability will reduce due to a second glare error is large compared with a first glare error. Therefore, when a second glare error is detected, it is possible to cause the processing circuit 120 to execute error handling processing that enables restoration of the visual recognizability more directly.

Specifically, when the occurrence of a first glare error is detected, the processing circuit 120 performs processing for notifying the host of the error. When the occurrence of a second glare error is detected, the processing circuit 120 performs display-off processing for turning off display on the head-up display.

The display-off processing is processing that is executed on the head-up display by the circuit device 100 directly without intervention by the host or the like. The display-off processing is processing for preventing an image from being displayed on the head-up display irrespective of the content of the image data, by turning off the light source of the head-up display, for example. Note that specific examples of the display-off processing will be described later.

According to this embodiment, when a first glare error is detected, the processing circuit 120 notifies the host of the error, and thus it is possible to allow the host to deal with the error. For example, the host may normalize display on the head-up display by resetting the system, or the like. Specifically, the host may perform a handling process of restoring the visual recognizability of the background while maintaining the display as much as possible. On the other hand, when a second glare error is detected, no image is displayed on the head-up display as a result of the processing circuit 120 performing the display-off processing. Accordingly, the circuit device 100 can execute a handling process of restoring the visual recognizability of the background directly without intervention by the host. Appropriate error handling processing can be executed according to a glare error at each level by providing the first threshold value and the second threshold value as described above. Normally, error processing is performed when a first glare error or a second glare error occurs at least in one frame, but error processing may also be executed when an error has occurred in a plurality of frames consecutively.

In addition, in this embodiment, a glare index value is a luminance value obtained from the integration value of the pixel values of the image data IMD for head-up display. A glare index value is obtained from the integration value of one frame in this manner, but may be obtained from the pixel values of a plurality of frames.

Specifically, the error detection circuit 110 integrates the pixel values included in the image data IMD for head-up display, of one screen, namely one display frame. The error detection circuit 110 may also use the integration value itself as a luminance value, or may also convert the integration value into a luminance value by performing some form of calculation. For example, a configuration may also be adopted in which the error detection circuit 110 obtains the average value of the pixel values in one screen by dividing the integration value by the number of pixels, and uses the average value as a luminance value. Here, the image data IMD for head-up display for one screen, namely one display frame, may be image data of the entire screen, or may also be image data of a specific region in the screen.

As described above, the pixel value of a pixel indicates a degree to which the pixel blocks the background or the degree of glare of the pixel. By integrating such pixel values in a screen, it is possible to obtain a degree to which the screen of the head-up display reduces the visual recognizability of the background.

Specifically, assuming the glare index value is B, B equals $C1\times Rsum+C2\times Gsum+C3\times Bsum$. Here, Rsum denotes the integration value of red pixel values, Gsum denotes the integration value of green pixel values, Bsum denotes the integration value of blue pixel values, and C1, C2, and C3 denote coefficients. The coefficients C1, C2, and C3 are coefficients for converting an RGB pixel value into a YCrCb luminance value Y, and an appropriate coefficient is set according to a color space adopted in image data. Note that the coefficients C1, C2, and C3 are not limited thereto, and may be any real number larger than 0. In addition, the glare index value B may be calculated by calculating luminance values Y in units of pixels, and then integrating the luminance values Y. In that case, $Y=C1\times Rpx+C2\times Gpx+C3\times Bpx$, and $B=Ysum$. Rpx, Gpx, and Bpx respectively denote a red pixel value, a green pixel value, and a blue pixel value of one pixel. Ysum is an integration value of luminance values Y.

According to this embodiment, the processing circuit 120 can obtain the glare index value B equivalent to a luminance value, based on Rsum, Gsum, and Bsum that are integration values of pixel values. The larger the number of pixels having a non-zero pixel value is, and the larger the pixel values of such pixels are, the larger the glare index value B is. Therefore, the glare index value B is an index indicating a degree to which the head-up display will reduce the visual recognizability of the background.

In this embodiment, the first threshold value is smaller than half of the maximum value of the glare index value.

As described with reference to FIG. 2, the ratio of space occupied by an image within the screen of the head-up display is low to prevent the image displayed on the head-up display from blocking the background. Therefore, if image data is appropriate, it is conceivable that the glare index value B is never larger than half of the maximum value. In this embodiment, an abnormality in image data, namely a first glare error can be detected by setting the first threshold value to the maximum value of the glare index value.

Note that the glare index value is not limited to a luminance value that is based on the integration value of pixel values. For example, the glare index value may also be an index value indicating the area of a portion in which the background is blocked in the screen of the head-up display. For example, the glare index value may also be the number of pixels whose pixel values exceed a threshold value, from among the pixels included in the image data IMD for head-up display, of one screen.

2. Detailed Configuration Example

A detailed configuration example of this embodiment will be described below. First, applications of the circuit device 100 will be described.

Figure 4:
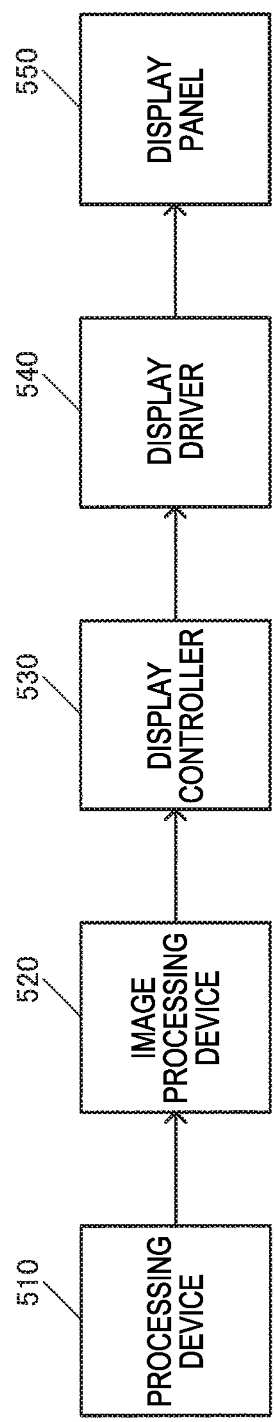
FIG. 4 is a first configuration example of a system for processing image data that is displayed on a head-up display.

FIG. 4 is a first configuration example of a system for processing image data that is to be displayed on a head-up display. The system in FIG. 4 includes a processing device 510, an image processing device 520, a display controller 530, a display driver 540, and a display panel 550.

The processing device 510 is a host device that controls the system. The processing device 510 is a SoC (System on Chip), and specifically is a microcomputer, a CPU, an MPU, or the like. The processing device 510 outputs image data to the image processing device 520.

The image processing device 520 performs various types of image processing on image data, and outputs the image data subjected to the processing, to the display controller 530. As examples of image processing, image deformation processing, superimposition processing, tone conversion processing, color conversion processing, and the like can be envisioned. The head-up display presents an image to the user by projecting the image onto a transparent screen, or displaying the image on a transparent display panel. At this time, as a result of transforming the image to follow a curve and the like of the transparent screen or the transparent display panel, the image does not appear distorted to the user. Such image deformation processing is performed by the image processing device 520.

The display controller 530 performs timing control of display on the head-up display. Specifically, the display controller 530 outputs a timing control signal such as a synchronization signal along with image data, to the display driver 540.

The display driver 540 displays an image on the display panel 550 by driving the display panel 550 based on the received timing control signal and image data. The display panel 550 is a liquid crystal display panel, a reflection apparatus, a transparent organic EL panel, or the like. As the reflection apparatus, a DLP (Digital Light Processing) method for displaying a video image by turning on/off reflections of mirrors in a mirror array, or a laser scanning method for displaying a video image by scanning laser light using a MEMS scanner can be adapted, for example. If the display panel 550 is a liquid crystal display panel or a reflection apparatus, an image is presented to the user by a display image thereof being projected onto the transparent screen.

The processing device 510, the image processing device 520, the display controller 530, and the display driver 540 are each configured as an integrated circuit device. Alternatively, two or more out of the processing device 510, the image processing device 520, the display controller 530, and the display driver 540 may be configured as one integrated circuit device. For example, functions of the display controller 530 and the display driver 540 may also be realized by one integrated circuit device, or functions of the image processing device 520 and the display controller 530 may also be realized by one integrated circuit device.

Figure 5:
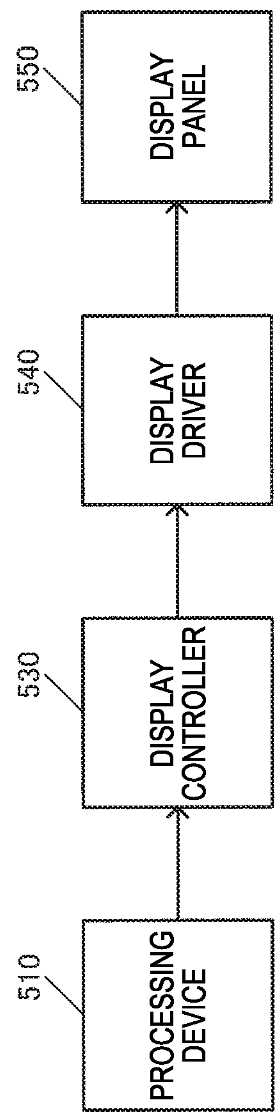
FIG. 5 is a second configuration example of a system for processing image data that is displayed on a head-up display.

FIG. 5 is a second configuration example of a system for processing image data to be displayed on a head-up display. The system in FIG. 5 includes the processing device 510, the display controller 530, the display driver 540, and the display panel 550.

In FIG. 5, functions of the image processing device 520 are implemented in the processing device 510, which is an SoC. Specifically, functions of the image processing device 520 are realized by the processing device 510 executing a program in which functions of the image processing device 520 are written. The display controller 530, the display driver 540, and the display panel 550 are similar to those in FIG. 4.

In FIG. 5, the processing device 510, the display controller 530, and the display driver 540 are each configured as an integrated circuit device. Alternatively, two or more of the processing device 510, the display controller 530, and the display driver 540 may also be configured as one integrated circuit device. For example, functions of the display controller 530 and the display driver 540 may also be realized by one integrated circuit device.

All of the integrated circuit devices described with reference to FIGS. 4 and 5 can include the error detection circuit 110 and the processing circuit 120 described with reference to FIG. 3. In addition, a system for processing image data can also be configured to have a configuration in which the circuit device 100 includes one of the integrated circuit devices. Accordingly, this embodiment can be applied to all of the above-described integrated circuit devices.

Figure 6:
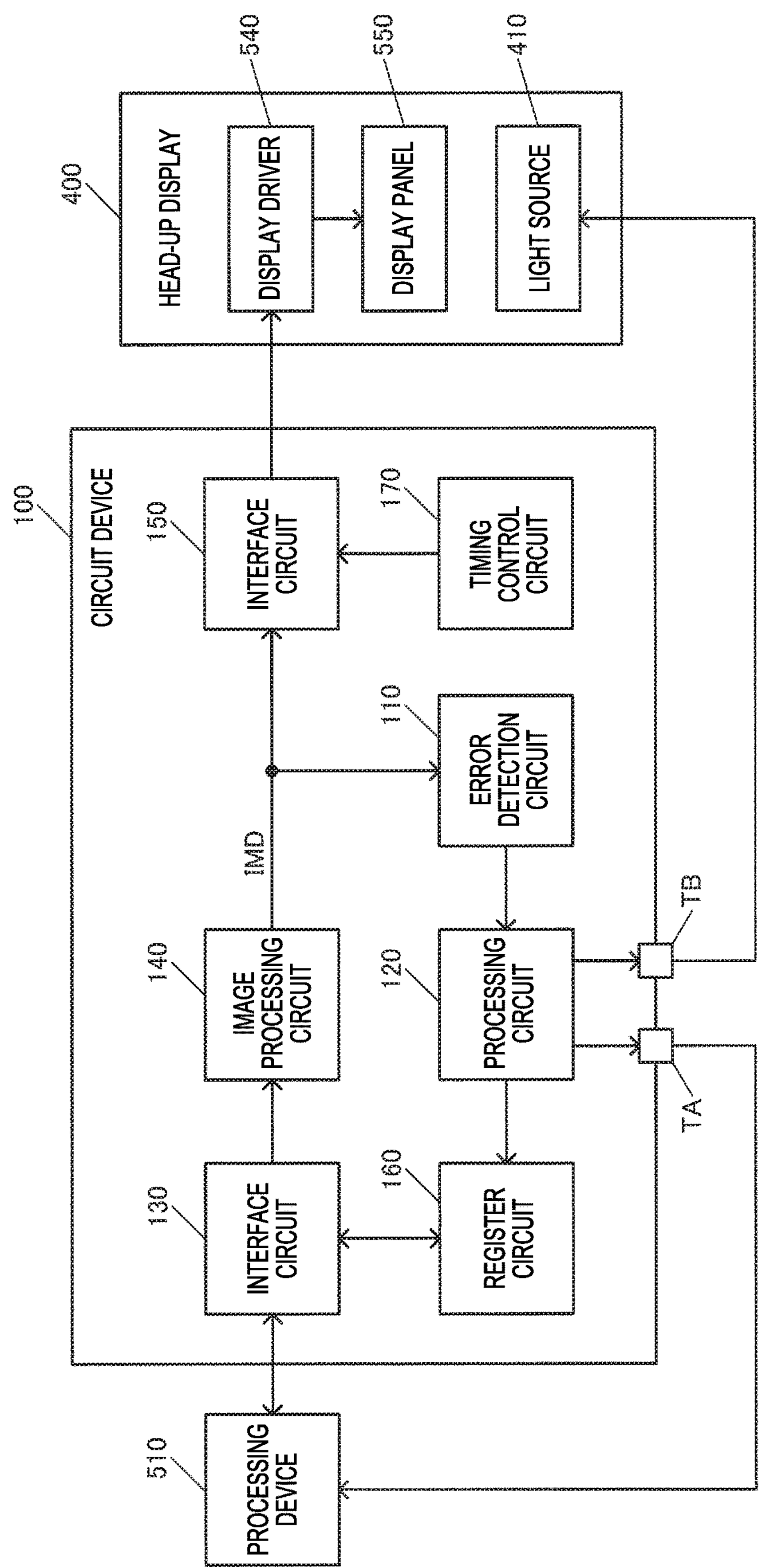
FIG. 6 is a detailed configuration example of a circuit device that has functions of an image processing device and a display controller.

A detailed configuration example of the circuit device 100 will be described below. FIG. 6 is a detailed configuration example of the circuit device 100 that has the functions of the image processing device 520 and the display controller 530. In the configuration example in FIG. 6, a head-up display 400 includes the display driver 540, the display panel 550, and a light source 410. Note that a case will be described in which the display panel 550 is a liquid crystal display panel, as an example, with reference to FIG. 6, but the configuration of the head-up display is not limited thereto.

The circuit device 100 includes the error detection circuit 110, the processing circuit 120, an interface circuit 130, an image processing circuit 140, an interface circuit 150, a register circuit 160, a timing control circuit 170, and terminals TA and TB. Note that the same reference numerals are assigned to the same constituent elements as the above-described constituent elements, and a description of the constituent elements is omitted as appropriate.

The interface circuit 130 performs inter-circuit communication between the processing device 510 and the circuit device 100. Specifically, the processing device 510 transmits image data to the circuit device 100, and the interface circuit 130 receives the image data, and outputs the image data to the image processing circuit 140. The processing device 510 also transmits setting information for setting operations of the circuit device 100, and the interface circuit 130 receives the setting information, and writes the setting information into the register circuit 160. Also, the interface circuit 130 reads out the information stored in the register circuit 160, and transmits the information to the processing device 510. For example, the interface circuit 130 can include an image data interface that complies with the LVDS (Low Voltage Differential Signaling) method, RGB parallel method, eDP (embedded Display Port) method, or the like. In addition, the interface circuit 130 may also include a serial communication interface that complies with the SPI (Serial Peripheral Interface) method, I2C (Inter Integrated Circuit) method, or the like.

The image processing circuit 140 is a circuit for realizing functions of the image processing device 520 described above. Specifically, the image processing circuit 140 performs image deformation processing for projecting images on the screen of the head-up display. In addition, the image processing circuit 140 may also perform gamma correction, FRC (Frame Rate Control), white balance processing, image rotation processing, superimposition processing, and the like. The image processing circuit 140 generates image data IMD for head-up display by performing the above-mentioned image processing, and outputs the image data IMD for head-up display to the interface circuit 150.

The timing control circuit 170 is a circuit for realizing functions of the display controller 530 described above. Specifically, the timing control circuit 170 generates a timing control signal for performing timing control of display on the head-up display, and outputs the timing control signal to the interface circuit 150.

The interface circuit 150 outputs the image data IMD for head-up display and the timing control signal to the display driver 540 of the head-up display 400. For example, the interface circuit 150 is an image data interface that complies with the LVDS method, RGB parallel method, mini-LVDS method, RSDS (Reduced Swing Differential Signaling) method, iSP method, or the like. The display driver 540 displays an image on the display panel 550 by driving the display panel 550 based on the received image data and timing control signal. The light source 410 irradiates projection light onto the display panel 550, light that has passed through the display panel 550 is projected onto a transparent screen, and thus an image is displayed on the transparent screen.

The error detection circuit 110 obtains a glare index value based on the image data IMD for head-up display that is input to the interface circuit 150, and outputs the glare index value to the processing circuit 120. With such a configuration, on the path of image processing in the circuit device 100, a glare error can be detected at a location on the downstream side closest to the head-up display 400. Where on the path of image processing a glare error will occur is unknown, and thus it is desirable that an error can be detected in as late a stage as possible in the processing.

When the glare index value exceeds the first threshold value, the processing circuit 120 outputs an interrupt request signal from the terminal TA to the processing device 510, which is a host, and writes, into the register circuit 160, first error information indicating the occurrence of a first glare error. When the interrupt request signal is input from the circuit device 100, the processing device 510 reads out the first error information from the register circuit 160 via the interface circuit 130. The processing device 510 determines that the first glare error has occurred, based on the first error information, and performs processing for removing the first glare error.

When the glare index value exceeds the second threshold value, the processing circuit 120 outputs a control signal instructing that the light source 410 be turned off, from the terminal TB to the light source 410. This processing is the above-described display-off processing. The light source 410 turns off projection light based on the control signal input from the circuit device 100. Accordingly, display on the head-up display 400 is turned off.

Note that the error detection circuit 110, the processing circuit 120, the image processing circuit 140, the register circuit 160, and the timing control circuit 170 are logic circuits. These logic circuits may be configured as separate circuits, or may also be configured as an integrated circuit through automatic placement and routing and the like. Alternatively, some or all of these logic circuits may also be realized by a processor such as a DSP (Digital Signal Processor). In this case, programs and instruction sets in which the functions of the circuits are written are stored in a memory, and due to the programs and instruction sets being executed by the processor, the functions of the circuits are realized.

Figure 7:
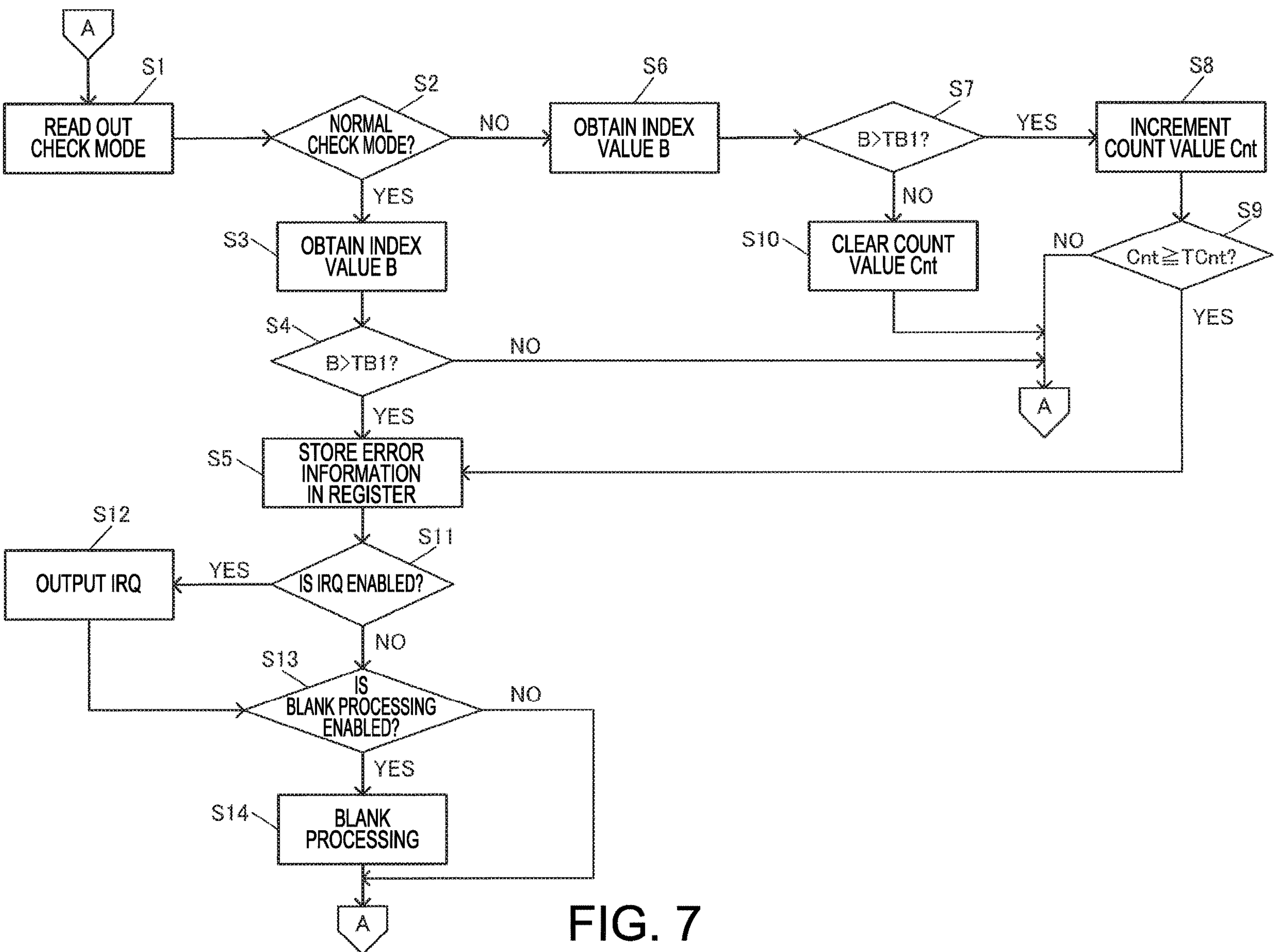
FIG. 7 is a flowchart illustrating procedures of glare error detection processing and processing corresponding to a glare error.

FIG. 7 is a flowchart illustrating procedures of glare error detection processing and processing corresponding to a glare error. Note that a description is given with reference to the configuration example in FIG. 6, but even if error detection is applied to one of the applications described with reference to FIGS. 4 and 5, the procedures in FIG. 7 can be used. In addition, a first glare error will be described with reference to FIG. 7 as an example, but the procedures in FIG. 7 can be applied to a second glare error by replacing TB1 in the flowchart with TB2. A procedure for a first glare error and a procedure for a second glare error may be executed in parallel, or may also be executed sequentially.

In step S1, the error detection circuit 110 reads out a check mode from the register circuit 160. A check mode is written in the register circuit 160 by the processing device 510 in advance. In step S2, the error detection circuit 110 determines whether or not a normal check mode is set. The normal check mode is a mode for performing determination that is based on a threshold value only once. Note that information regarding the check mode that is written in the register circuit 160 may be information regarding the number of times determination that is based on a threshold value is to be performed. The error detection circuit 110 performs determination on the branch taken in step S2 based on the number-of-times information.

If it is determined in step S2 that the normal check mode is set, the error detection circuit 110 obtains the glare index value B in step S3. In step S4, the error detection circuit 110 determines whether or not the glare index value B is larger than a first threshold value TB1. If the glare index value B is not larger than the first threshold value TB1, the procedure returns to step S1. If the glare index value B is larger than the first threshold value TB1, the processing circuit 120 writes the first error information indicating the occurrence of a first glare error, into the register circuit 160.

If it is determined in step S2 that the normal check mode is not set, the error detection circuit 110 obtains the glare index value B in step S6. In step S7, the error detection circuit 110 determines whether or not the glare index value B is larger than the first threshold value TB1.

The error detection circuit 110 has a counter that counts the number of times an error is detected. If it is determined in step S7 that the glare index value B is larger than the first threshold value TB1, the error detection circuit 110 increments a count value Cnt of the counter in step S8. In step S9, the error detection circuit 110 determines whether or not the count value Cnt is larger than or equal to a threshold value TCnt. The threshold value TCnt is written in the register circuit 160 by the processing device 510 in advance, for example. If the count value Cnt is not larger than or equal to the threshold value TCnt, the procedure returns to step S1. If the count value Cnt is larger than or equal to the threshold value TCnt, the processing circuit 120 executes step S5.

If it is determined in step S7 that the glare index value B is not larger than the first threshold value TB1, the error detection circuit 110 clears the count value Cnt in step S10. In other words, the error detection circuit 110 sets the count value Cnt to zero. After step S10, the procedure returns to step S1.

Immediately after step S5, in step S11, the processing circuit 120 determines whether or not an interrupt request setting is enabled. The interrupt request setting is written in the register circuit 160 by the processing device 510 in advance, for example. If the interrupt request setting is enabled, the processing circuit 120 outputs an interrupt request signal from the terminal TA to the processing device 510 in step S12.

In step S13, after step S12, if it is determined in step S11 that the interrupt request setting is not enabled, the processing circuit 120 determines whether or not blank processing setting is enabled. The blank processing setting is written in the register circuit 160 by the processing device 510 in advance, for example. If the blank processing setting is enabled, the processing circuit 120 executes blank processing in step S14. The blank processing is, for example, the above-described display-off processing, or processing for bringing image data into a blank state. The blank state is a state where the pixel values of all of the pixels are zero, for example, and is a state where the background is transmitted through the head-up display as a result of no image being displayed on the head-up display. In display-off processing, a display operation itself is turned off by turning off the light source, or the like, but, in blank processing, a display operation is not turned off. After step S14, or if it is determined in in step S13 that the blank processing setting is not enabled, the procedure returns to step S1.

Figure 8:
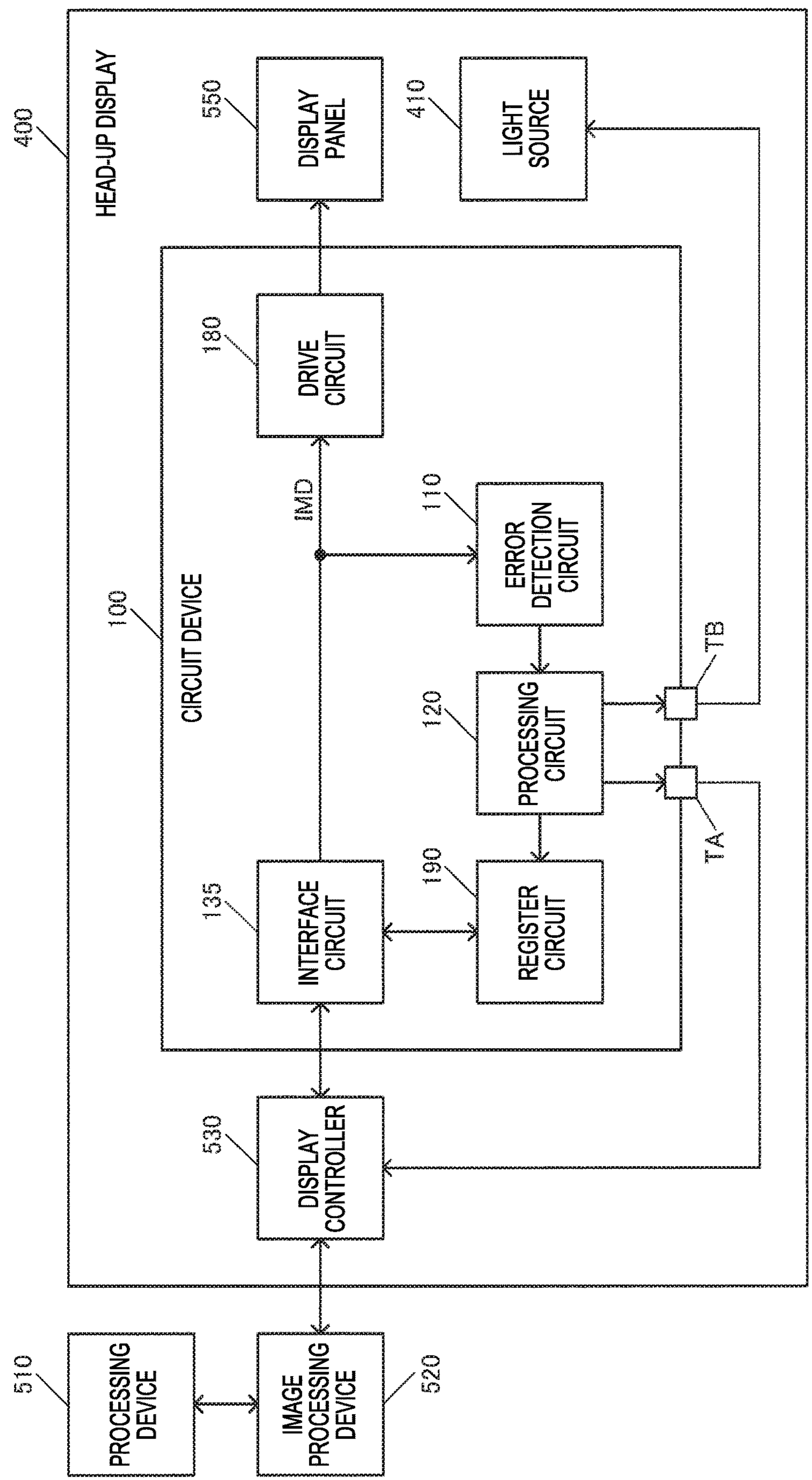
FIG. 8 is a detailed configuration example of a circuit device that has a function of a display driver.

FIG. 8 is a detailed configuration example of the circuit device 100 that has a function of the display driver 540. In the configuration example in FIG. 8, the head-up display 400 includes the display controller 530, the display driver 540, the display panel 550, and the light source 410. Note that, as an example, a case in which the display panel 550 is a liquid crystal display panel will be described with reference to FIG. 8, but the configuration of the head-up display is not limited thereto.

The circuit device 100 includes the error detection circuit 110, the processing circuit 120, an interface circuit 135, a drive circuit 180, a register circuit 190, and the terminals TA and TB. Note that the same reference numerals are assigned to the same constituent elements as those described above, and a description of the constituent elements is omitted as appropriate.

The interface circuit 135 performs inter-circuit communication between the display controller 530 and the circuit device 100. Specifically, the display controller 530 transmits image data and a timing control signal to the circuit device 100, and the interface circuit 135 receives the image data and timing control signal, and outputs them to the drive circuit 180. In FIG. 8, image data that is input to the drive circuit 180 is image data IMD for head-up display. In addition, the display controller 530 transmits setting information for setting operations of the circuit device 100, and the interface circuit 135 receives the setting information, and writes the setting information into the register circuit 190. For example, the interface circuit 130 can include an image data interface that complies with the LVDS method, RGB parallel method, eDP method, or the like. In addition, the interface circuit 130 may also include a serial communication interface that complies with the SPI method, I2C method, or the like.

The drive circuit 180 drives the display panel 550 based on the image data IMD for head-up display and timing control signal. For example, the drive circuit 180 includes a data line driver that drives the data lines of the liquid crystal display panel, and a scanning line driver that drives the scanning lines of the liquid crystal display panel.

The error detection circuit 110 obtains a glare index value based on the image data IMD for head-up display that is input to the drive circuit 180, and outputs the glare index value to the processing circuit 120. As a result of the display driver detecting a glare error, a glare error can be detected at a location closest to the head-up display 400, on the path of image processing in the system. Where on the path of image processing a glare error will occur is unknown, and thus it is desirable that an error can be detected in as late a stage as possible in the processing.

When the glare index value exceeds the first threshold value, the processing circuit 120 outputs an interrupt request signal from the terminal TA to the display controller 530, which is the host of the circuit device 100, and writes, into the register circuit 190, first error information indicating the occurrence of a first glare error. When the interrupt request signal is input from the circuit device 100, the display controller 530 reads out the first error information from the register circuit 190 via the interface circuit 135. The display controller 530 determines that a first glare error has occurred, based on the first error information, and performs processing for removing the first glare error. Note that, when the glare index value exceeds the first threshold value, the processing circuit 120 may also output an interrupt request signal from the terminal TA to the processing device 510, which is the host of the system.

When the glare index value exceeds the second threshold value, the processing circuit 120 outputs a control signal instructing that the light source 410 be turned off, from the terminal TB to the light source 410. This processing is above-described display-off processing. The light source 410 turns off projection light based on the control signal input from the circuit device 100. Accordingly, display on the head-up display 400 is turned off.

Note that the error detection circuit 110, the processing circuit 120, and the register circuit 190 are logic circuits. These logic circuits may be configured as separate circuits, or may also be configured as an integrated circuit through automatic placement and routing and the like. Alternatively, some of or all of these logic circuits may also be realized by a processor such as a DSP (Digital Signal Processor). In this case, programs and instruction sets in which the functions of the circuits are written are stored in a memory, and the functions of the circuits are realized by the programs and instruction sets being executed by the processor.

3. Head-Up Display

A detailed configuration example of the head-up display will be described.

Figure 9:
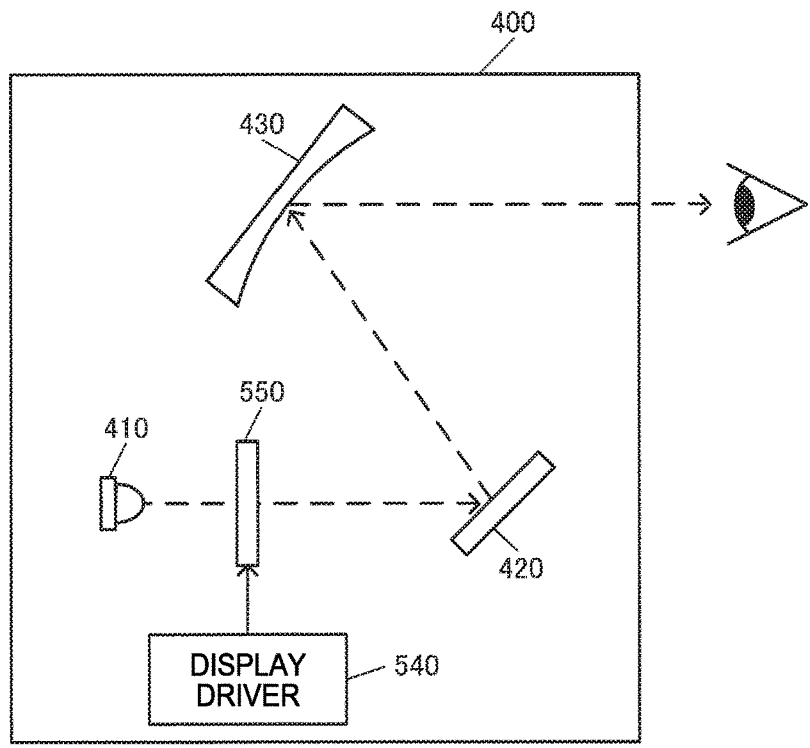
FIG. 9 is a detailed configuration example of a head-up display whose display panel is a liquid crystal display panel.

FIG. 9 is a detailed configuration example of the head-up display 400 in which the display panel 550 is a liquid crystal display panel. The head-up display 400 in FIG. 9 includes the light source 410, the display driver 540, a mirror 420, and a transparent screen 430.

The light source 410 includes an LED or a light-emitting element such as a laser, and a drive circuit that drives the light-emitting element. A control signal for turning off display that has been output from the processing circuit 120 of the circuit device 100 is input to the drive circuit, which stops driving of the light-emitting element based on the control signal, and thereby light-emission of the light source 410 is turned off.

Light emitted by the light source 410 passes through the liquid crystal display panel, and is reflected by the mirror 420 in the direction of the transparent screen 430. The reflective face of the transparent screen 430 is a concave face, for example, and a projected image when viewed from the user is a virtual image. Accordingly, the projected image appears to be formed to be beyond the transparent screen 430 when viewed from the user. Accordingly, the projected image can be displayed in the background.

Figure 10:
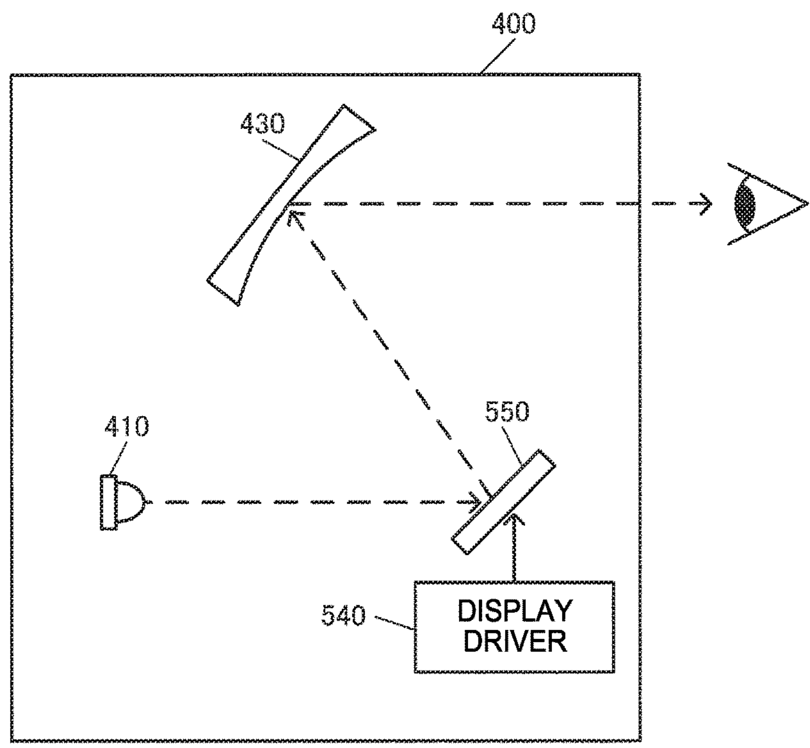
FIG. 10 is a detailed configuration example of a head-up display whose display panel is a DLP reflection apparatus.

FIG. 10 is a detailed configuration example of the head-up display 400 in which the display panel 550 is a DLP reflection apparatus. The head-up display 400 in FIG. 10 includes the light source 410, the display driver 540, the display panel 550, and the transparent screen 430. Note that, as described above, the reflection apparatus may adopt a laser-scanning method.

The display driver 540 drives the reflection apparatus based on display data and a timing control signal. In the reflection apparatus, micromirrors are arranged in an array, and the display driver 540 controls inclinations of the micromirrors based on the display data. As a result of the micromirrors of the reflection apparatus reflecting light from the light source 410, an image is projected onto the transparent screen 430.

In display-off processing, the processing circuit 120 of the circuit device 100 outputs, to the head-up display 400, a control signal instructing that the light source 410 be turned off or a control signal instructing that driving of the reflection apparatus be turned off. The control signal instructing that the light source 410 be turned off is input to the drive circuit of the light source 410, and the drive circuit stops driving of the light-emitting element based on the control signal, and thus light emission of the light source 410 is turned off. The control signal instructing that driving of the reflection apparatus be turned off is input to the display driver 540, and the display driver 540 stops driving of the reflection apparatus based on the control signal, and thus display on the reflection apparatus is turned off.

Figure 11:
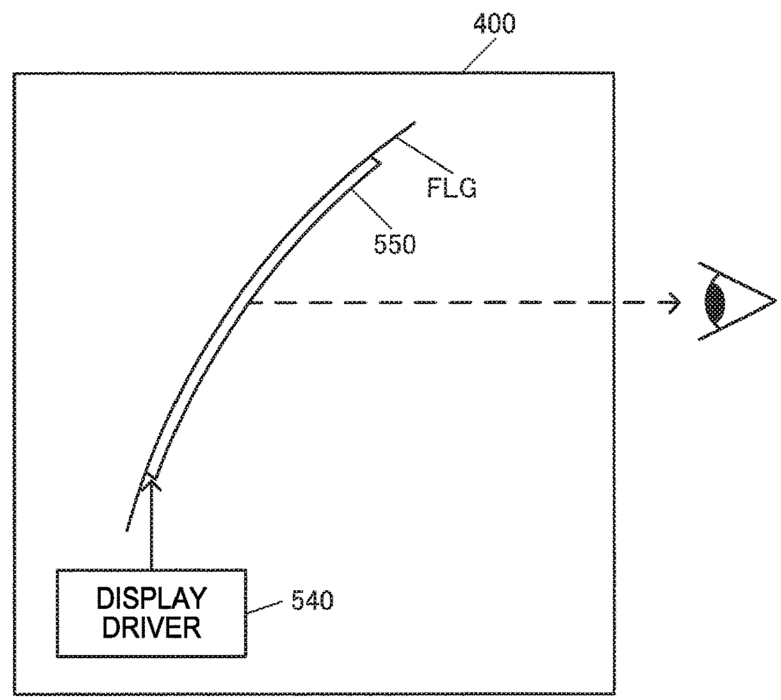
FIG. 11 is a detailed configuration example of a head-up display whose display panel is a transparent organic EL panel.

FIG. 11 is a detailed configuration example of the head-up display 400 in which the display panel 550 is a transparent organic EL panel. The head-up display 400 in FIG. 11 includes the display driver 540 and the display panel 550.

The transparent organic EL panel, which is the display panel 550, can be flexibly bent, and is attached to a windshield FLG of an automobile, or the like. The display driver 540 includes, for example, a data line driver that drives the data lines of the organic EL panel and a scanning line driver that drives the scanning lines of the organic EL panel.

In display-off processing, the processing circuit 120 of the circuit device 100 outputs a control signal instructing that driving of the organic EL panel be turned off, to the head-up display 400. The control signal is input to the display driver 540, and the display driver 540 stops driving of the organic EL panel based on the control signal, and thus display on the organic EL panel is turned off.

Figure 12:
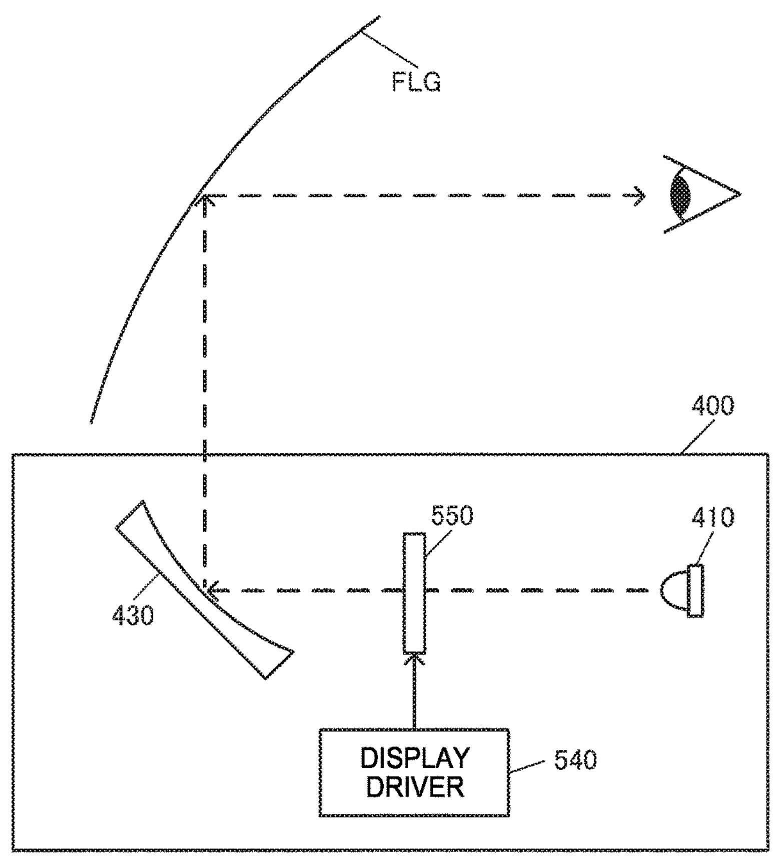
FIG. 12 is a detailed configuration example of a head-up display projecting an image onto a windshield.

FIG. 12 is a detailed configuration example of the head-up display 400 when an image is projected onto the windshield FLG. The head-up display 400 in FIG. 12 includes the light source 410, the mirror 420, the display driver 540, and the display panel 550.

In FIG. 12, the display panel 550 is a liquid crystal display panel. Light emitted from the light source 410 passes through the liquid crystal display panel, and is reflected by the mirror 420 in the direction of the windshield FLG. Accordingly, a projected image can be displayed in the background. Note that the display panel 550 may also be a reflection apparatus. In this case, the mirror 420 is omitted. As a result of the reflection apparatus reflecting light from the light source 410, an image is projected onto the windshield FLG.

4. Electronic Apparatus and Mobile Body

Figure 13:
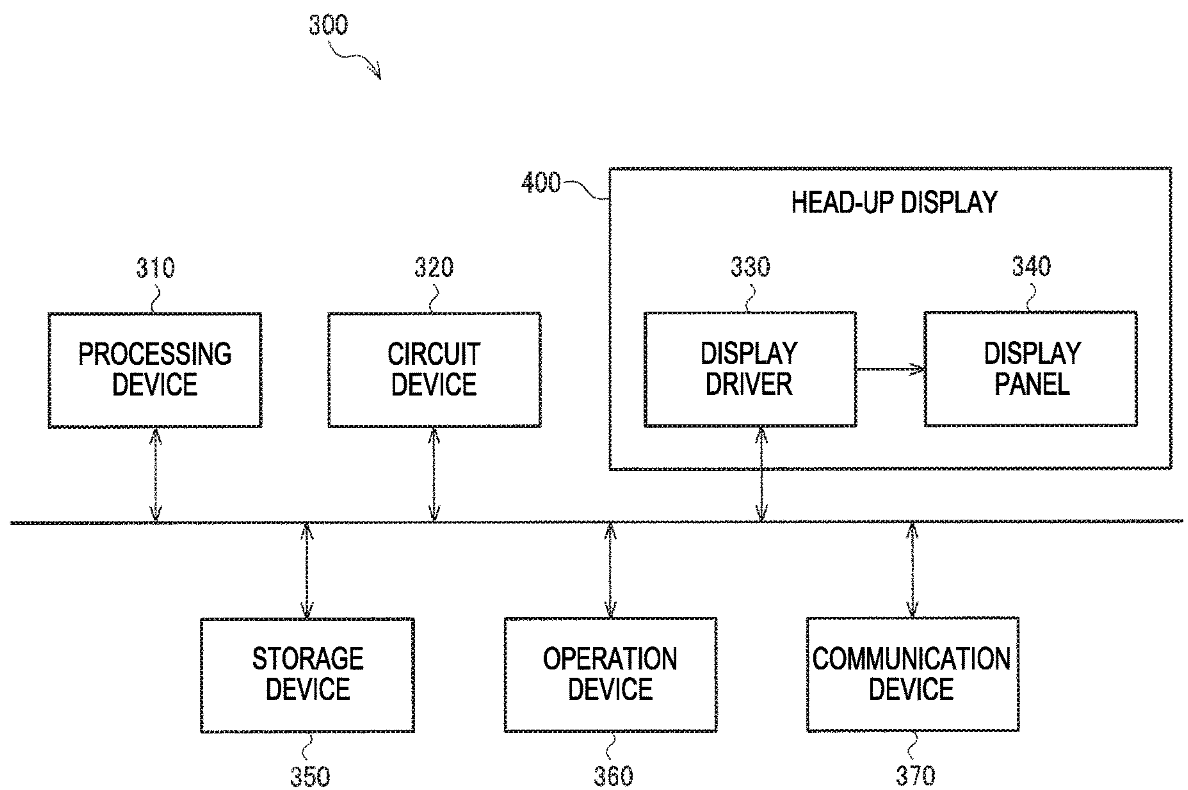
FIG. 13 is a configuration example of an electronic apparatus.

FIG. 13 is a configuration example of an electronic apparatus that includes a circuit device 320 of this embodiment. An electronic apparatus 300 includes a processing device 310, the circuit device 320, a storage device 350, an operation device 360, a communication device 370, and the head-up display 400. The head-up display 400 includes a display driver 330 and a display panel 340. The processing device 310 is an MCU, for example. In the configuration example in FIG. 13, the circuit device 320 corresponds to a display controller. However, as described with reference to FIGS. 4 and 5, the glare error detection technique can be applied to various integrated circuit devices that process image data.

The processing device 310 transfers, to the circuit device 320, image data stored in the storage device 350 or image data received by the communication device 370. The circuit device 320 performs image processing on image data, display timing control, glare error detection in image data to be transferred to the display driver, and the like. The display driver 330 drives the display panel 340 to display an image, based on the image data transferred from the circuit device 320 and display timing control that is performed by the circuit device 320. The display panel 340 is a liquid crystal display panel, an EL display panel, or the like. The storage device 350 is a memory, a hard disk drive, an optical disk drive, or the like. The operation device 360 is a device for the user to operate the electronic apparatus 300, and is composed of buttons, a touch panel, a keyboard, or the like. The communication device 370 is, for example, a device that performs wired communication or a device that performs wireless communication. Wired communication is communication that uses a LAN, a USB, or the like. Wireless communication is communication that uses a wireless LAN, wireless proximity communication, or the like.

As the electronic apparatus that includes the circuit device of this embodiment, various apparatuses such as an on-vehicle electronic apparatus, display terminals of a plant facility and the like, a display device mounted in a robot, or an information processing device can be envisioned. The on-vehicle electronic apparatus is a meter panel, for example. The information processing device is a PC, for example.

Figure 14:
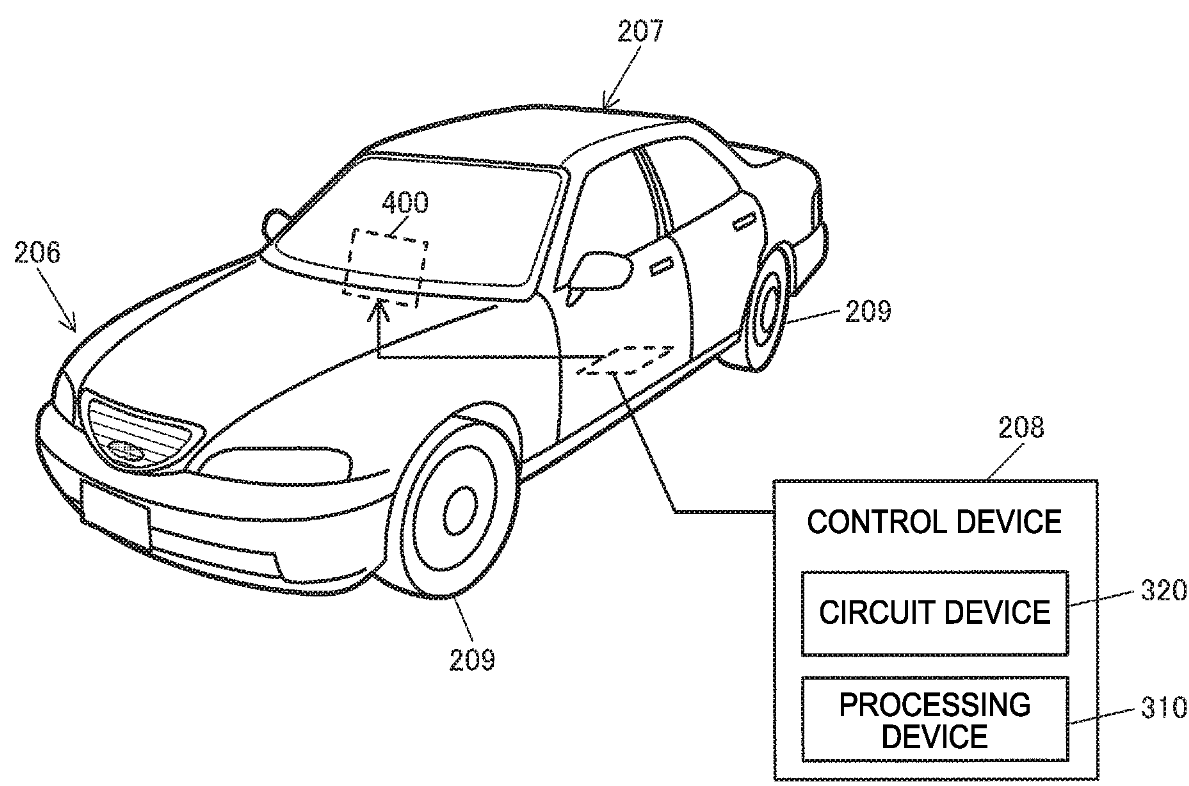
FIG. 14 is an example of a mobile body.

FIG. 14 shows an example of a mobile body that includes the circuit device 320 of this embodiment. The mobile body includes the circuit device 320 of this embodiment, and the processing device 310 that performs error handling processing based on a result of glare error detection performed by the circuit device 320. Specifically, the mobile body includes the head-up display 400 and a control device 208. The control device 208 is an ECU (Electronic Control Unit), in which the circuit device 320 and the processing device 310 are incorporated. Note that the circuit device 320 may also be incorporated in the head-up display 400. The circuit device 320 of this embodiment can be incorporated in various mobile bodies such as an automobile, an aircraft, a motorcycle, a bicycle, and a vessel. The mobile body is an apparatus/device that is provided with a driving mechanism such as an engine or motor, a steering mechanism such as a handle or rudder, and various electronic apparatuses, and moves on the ground, in the air, or on the sea. FIG. 14 schematically shows an automobile 206, which is a specific example of the mobile body. The head-up display 400 has a transparent screen, which is installed between the driver's seat and the windshield. Alternatively, the head-up display may use the windshield as a transparent screen and project an image onto the windshield. The head-up display 400 functions as a meter panel of the automobile 206, for example.

The above-described circuit device of this embodiment includes an error detection circuit and a processing circuit. The error detection circuit obtains a glare index value, which is an index value indicating glare of a head-up display, based on image data for head-up display. The error detection circuit determines whether or not the glare index value has exceeded a first threshold value, and, when the glare index value exceeds the first threshold value, detects the occurrence of a first glare error. When the occurrence of the first glare error is detected, the processing circuit performs processing corresponding to the first glare error.

With such a configuration, whether or not an image to be displayed on the head-up display will reduce the visual recognizability of the background can be detected based on the image data for head-up display. Since it is possible to detect image data for head-up display that will reduce the visual recognizability of the background, the circuit device or an external device outside thereof can perform processing for preventing a reduction in the visual recognizability, based on the detection result.

In addition, in this embodiment, the error detection circuit may determine whether or not the glare index value has exceeded a second threshold value that is larger than the first threshold value, and, when it is determined that the glare index value has exceeded the second threshold value, may detect the occurrence of a second glare error.

With such a configuration, the occurrence of a glare error can be detected using threshold values at two levels, and appropriate error handling processing can be executed in accordance with a glare error detected using a threshold value at each of the levels. In this embodiment, the second threshold value is larger than the first threshold value, and thus a degree to which a second glare error will reduce the visual recognizability is higher compared with a first glare error. For example, when a second glare error is detected, the processing circuit executes error handling processing that enables more direct restoration of the visual recognizability.

In addition, in this embodiment, when the occurrence of the second glare error is detected, the processing circuit may perform display-off processing for turning off display on the head-up display.

With such a configuration, when a second glare error is detected, the processing circuit performs display-off processing, and thus no image is displayed on the head-up display. Accordingly, the circuit device can execute a handling process of restoring the visual recognizability of the background directly without intervention of a host.

In addition, in this embodiment, the head-up display may include a liquid crystal display panel and a light source. The display-off processing may be processing for outputting a control signal instructing that the light source be turned off, to the head-up display.

With such a configuration, when a second glare error is detected by the error detection circuit, the light source of the head-up display is turned off. Since the light source for projecting a display image of the liquid crystal display panel onto a transparent screen is turned off, display on the head-up display is turned off, and the visual recognizability of the background is restored.

In addition, in this embodiment, the head-up display may include an organic EL panel. The display-off processing may be processing for outputting a control signal instructing that display on the organic EL panel be turned off.

With such a configuration, when a second glare error is detected by the error detection circuit, display on the organic EL panel of the head-up display is turned off. Since display on the organic EL panel is turned off, display on the head-up display is turned off, and the visual recognizability of the background is restored.

In addition, in this embodiment, the head-up display may include a reflection apparatus and a light source. The display-off processing may be processing for outputting a control signal instructing that the light source be turned off, to the head-up display, or processing for outputting a control signal instructing that driving of the reflection apparatus be turned off, to the head-up display.

With such a configuration, when a second glare error is detected by the error detection circuit, the light source that irradiates light onto the reflection apparatus or driving of the reflection apparatus is turned off. Since the light source that irradiates light onto the reflection apparatus or driving of the reflection apparatus is turned off, display on the head-up display is turned off, and the visual recognizability of the background is restored.

In addition, in this embodiment, when the occurrence of the second glare error is detected, the processing circuit may perform processing for making a notification to a host.

With such a configuration, when a second glare error is detected, the processing circuit notifies the host of the error, and thus it is possible to allow the host to deal with the error. For example, the host may perform a handling process of restoring the visual recognizability of the background by turning off display on the head-up display.

In addition, in this embodiment, when the occurrence of the first glare error is detected, the processing circuit may perform processing for making a notification to a host.

With such a configuration, when a first glare error is detected, the processing circuit notifies the host of the error, and thus it is possible to allow the host to deal with the error. For example, the host may also perform a handling process of restoring the visual recognizability of the background while maintaining the display as much as possible.

In addition, in this embodiment, the notification processing may be processing for outputting an interrupt request to the host.

With such a configuration, when the occurrence of a first glare error is detected, an interrupt request is output to the host, and thus it is possible to notify the host of the occurrence of the first glare error using the interrupt request.

In addition, in this embodiment, the glare index value may be a luminance value obtained from an integration value of pixel values of the image data for head-up display. Alternatively, the glare index value may also be obtained by obtaining luminance values in units of pixels and integrating the luminance values.

The pixel value of a pixel indicates a degree to which the pixel blocks the background, or a degree of glare of the pixel. By integrating such pixel values within the screen, it is possible to obtain a degree to which the screen of the head-up display will reduce the visual recognizability of the background.

In addition, in this embodiment, a configuration may be adopted in which Rsum denotes an integration value of red pixel values, Gsum denotes an integration value of green pixel values, Bsum denotes an integration value of blue pixel values, and C1, C2, and C3 denote coefficients. At this time, the glare index value B may be equal to $C1\times Rsum+C2\times Gsum+C3\times Bsum$.

With such a configuration, the processing circuit can obtain the glare index value B equivalent to a luminance value based on Rsum, Gsum, and Bsum, which are integration values of pixel values. The larger the number of pixels having a non-zero pixel value is, and the larger the pixel values of such pixels are, the larger the glare index value B is. Therefore, the glare index value B is an index indicating a degree to which the head-up display will reduce the visual recognizability of the background.

In addition, in this embodiment, a configuration may be adopted in which Rpx denotes a red pixel value, Gpx denotes a green pixel value, Bpx denotes a blue pixel value, C1, C2, and C3 denote coefficients, Y denotes a luminance value of a pixel, and Ysum denotes an integration value of luminance values Y. At this time, the luminance value Y may be equal to $C1\times Rpx+C2\times Gpx+C3\times Bpx$. The glare index B may be equal to Ysum.

With such a configuration, the processing circuit can obtain the glare index value B=Ysum by integrating the luminance values Y of pixels. The higher the number of pixels having a non-zero luminance value is, and the larger the luminance values of such pixels are, the larger the glare index value B is. Therefore, the glare index value B is an index indicating a degree to which the head-up display will reduce the visual recognizability of the background.

In addition, in this embodiment, the first threshold value may be smaller than or equal to half of a maximum value of the glare index value.

The ratio space occupied by an image in the screen of the head-up display is low such that the image displayed on the head-up display does not block the background. Therefore, if the image data is appropriate, it is conceivable that the glare index value does not exceed half of the maximum value. In this embodiment, an abnormality in image data, namely a first glare error can be detected by setting the first threshold value to the maximum value of the glare index value.

In addition, in this embodiment, the error detection circuit may count the number of times the glare index value has exceeded the first threshold value, and detect the occurrence of the first glare error when the number of times reaches a predetermined value.

With such a configuration, it is possible to suppress incorrect detection of a first glare error. Specifically, even if glare is incorrectly detected due to noise and the like, if it is temporary, a first glare error is not detected.

In addition, the circuit device of this embodiment may also include an image processing circuit and an interface circuit. The image processing circuit may generate the image data for head-up display. The interface circuit may output the image data for head-up display to a display driver of the head-up display. The error detection circuit may obtain a glare index value based on the image data for head-up display that is input to the interface circuit.

Which stage of the processing where an abnormality in image data will occur is unknown, and thus it is desirable that a glare error is detected in as late a stage as possible in the processing. According to this embodiment, the error detection circuit can obtain a glare index value based on image data for head-up display that has been obtained after the circuit device has processed image data, and is lastly about to be output to the display driver.

In addition, the circuit device of this embodiment may also include a drive circuit. The drive circuit may drive a panel of the head-up display based on the image data for head-up display. The error detection circuit may obtain the glare index value based on the image data for head-up display that is input to the drive circuit.

As described above, it is desirable that a glare error is detected in as late a stage as possible in the processing. According to this embodiment, a glare error can be detected by the display driver that is at the last stage of image data processing.

In addition, an electronic apparatus of this embodiment includes the circuit device described above.

In addition, a mobile body of this embodiment includes the circuit device described above.

Note that the embodiment has been described in detail above, but those skilled in the art will readily understand that various modifications can be made without substantially departing from new matter and effects of the disclosure. Accordingly, all of such modifications are also encompassed in the scope of the disclosure. For example, a term described together with a different term having a broader meaning or the same meaning at least once in the specification or drawings may be replaced by the different term anywhere in the specification or drawings. Also, all combinations of the embodiments and variations of the disclosure are also encompassed in the scope of the disclosure. In addition, the configurations, operations, and the like of the circuit device, the head-up display, the electronic apparatus, and the mobile body are not limited to those described in the embodiment, and various modifications can be made thereto.

What is claimed is:

1. A circuit device comprising:

an error detection circuit that obtains a glare index value, which is an index value indicating glare of a head-up display, based on image data for head-up display for overlapping a background, determines whether or not the glare index value has exceeded a first threshold value and determines whether or not the glare index value has exceeded a second threshold value that is larger than the first threshold value, and, when the glare index value exceeds the first threshold value, detects occurrence of a first glare error and when the glare index value exceeds the second threshold value, detects occurrence of a second glare error; and a processing circuit that: when occurrence of the first glare error is detected, performs processing for making a notification to a host processing device that controls the head-up display and in response to receipt of the notification performs processing for removing the first glare error; and when occurrence of the second glare error is detected, performs display-off processing corresponding to the second glare error for turning off display on the head-up display.

2. The circuit device according to claim 1, wherein the head-up display includes a liquid crystal display panel and a light source, and the display-off processing is processing for outputting a control signal instructing that the light source be turned off, to the head-up display.

3. The circuit device according to claim 1, wherein the head-up display includes an organic EL panel, and the display-off processing is processing for outputting a control signal instructing that display on the organic EL panel be turned off.

4. The circuit device according to claim 1, wherein the head-up display includes a reflection apparatus and a light source, and the display-off processing is processing for outputting a control signal instructing that the light source be turned off, to the head-up display, or processing for outputting a control signal instructing that driving of the reflection apparatus be turned off, to the head-up display.

5. The circuit device according to claim 1, wherein the notification processing is processing for outputting an interrupt request to the host processing device.

6. The circuit device according to claim 1, wherein the glare index value is a luminance value obtained from an integration value of pixel values of the image data for head-up display.

7. The A circuit device according to claim 6, comprising:

an error detection circuit that obtains a glare index value, which is an index value indicating glare of a head-up display, based on image data for head-up display for overlapping a background, determines whether or not the glare index value has exceeded a first threshold value, and, when the glare index value exceeds the first threshold value, detects occurrence of a first glare error; and a processing circuit that performs processing corresponding to the first glare error when occurrence of the first glare error is detected, wherein, the glare index value is a luminance value obtained from an integration value of pixel values of the image data for head-up display, and when Rpx denotes a red pixel value, Gpx denotes a green pixel value, Bpx denotes a blue pixel value, C1, C2, and C3 denote coefficients, Y denotes a luminance value of a pixel, and Ysum denotes an integration value of luminance values Y, the luminance value Y is equal to $C1 \times Rpx + C2 \times Gpx + C3 \times Bpx$, and the glare index value B is equal to Ysum.

8. A circuit device comprising:

an error detection circuit that obtains a glare index value, which is an index value indicating glare of a head-up display, based on image data for head-up display for overlapping a background, determines whether or not the glare index value has exceeded a first threshold value, and, when the glare index value exceeds the first threshold value, detects occurrence of a first glare error; and a processing circuit that performs processing corresponding to the first glare error when occurrence of the first glare error is detected, wherein, the glare index value is a luminance value obtained from an integration value of pixel values of the image data for head-up display, and when Rsum denotes an integration value of red pixel values, Gsum denotes an integration value of green pixel values, Bsum denotes an integration value of blue pixel values, and C1, C2, and C3 denote coefficients, the glare index value B is equal to $C1 \times Rsum + C2 \times Gsum + C3 \times Bsum$.

9. A circuit device comprising:

an error detection circuit that obtains a glare index value, which is an index value indicating glare of a head-up display, based on image data for head-up display for overlapping a background, determines whether or not the glare index value has exceeded a first threshold value, and, when the glare index value exceeds the first threshold value, detects occurrence of a first glare error; and a processing circuit that performs processing corresponding to the first glare error when occurrence of the first glare error is detected, wherein the notification processing is processing for outputting an interrupt request to the host, and the first threshold value is smaller than or equal to half of a maximum value of the glare index value.

10. The circuit device according to claim 1, wherein the error detection circuit counts the number of times the glare index value has exceeded the first threshold value, and detects occurrence of the first glare error when the number of times reaches a predetermined value that is greater than one.

11. The circuit device according to claim 1, further comprising:

an image processing circuit that generates the image data for head-up display; and an interface circuit that outputs the image data for head-up display to a display driver of the head-up display, wherein the error detection circuit obtains the glare index value based on the image data for head-up display that is input to the interface circuit.

12. The circuit device according to claim 1, further comprising a drive circuit that drives a panel of the head-up display based on the image data for head-up display, wherein the error detection circuit obtains the glare index value based on the image data for head-up display that is input to the drive circuit.

13. An electronic apparatus comprising the circuit device according to claim 1.

14. A mobile body comprising the circuit device according to claim 1.

15. The circuit device according to claim 1, wherein the background is a field of vision of a user.

* * * * *